United States Patent
Qin et al.

(10) Patent No.: US 7,441,813 B2
(45) Date of Patent: Oct. 28, 2008

(54) BATTERY COVER LATCHING MECHANISM FOR PORTABLE ELECTRONIC DEVICE

(75) Inventors: Zhong-Shu Qin, Shenzhen (CN); Peng-Jin Ge, Shenzhen (CN); An-Ming Feng, Shenzhen (CN); Hsiao-Hua Tu, Tu-cheng (TW); Chia-Hua Chen, Tu-cheng (TW)

(73) Assignees: Sutech Trading Limited, Tortola (VG); ShenZhen Futaihong Precision Industry Co., Ltd., ShenZhen, Guangdong Province (CN)

( * ) Notice: Subject to any disclaimer, the term of this patent is extended or adjusted under 35 U.S.C. 154(b) by 38 days.

(21) Appl. No.: 11/398,059

(22) Filed: Apr. 4, 2006

(65) Prior Publication Data

US 2007/0010219 A1    Jan. 11, 2007

(30) Foreign Application Priority Data

Jul. 9, 2005    (CN)    ............... 2005 1 0035923

(51) Int. Cl.
  *E05C 1/08*    (2006.01)
(52) U.S. Cl. ............... 292/163; 292/DIG. 37; 292/170; 292/169.14
(58) Field of Classification Search ......... 292/163–164, 292/165, 170 X, 169, 169.14 X, DIG. 37 X
  See application file for complete search history.

(56) References Cited

U.S. PATENT DOCUMENTS

| 1,965,939 | A | * | 7/1934 | Jacobi | 70/81 |
| 2,648,561 | A | * | 8/1953 | Landon | 292/170 |
| 3,090,643 | A | * | 5/1963 | Barnes, Sr. | 292/170 |
| 5,028,083 | A | * | 7/1991 | Mischenko | 292/175 |
| 5,413,391 | A | * | 5/1995 | Clavin et al. | 292/170 |
| 5,626,374 | A | * | 5/1997 | Kim | 292/170 |
| 5,663,011 | A | * | 9/1997 | Bunyea et al. | 429/97 |
| 5,974,303 | A | * | 10/1999 | Krause | 455/575.1 |
| 6,575,503 | B1 | * | 6/2003 | Johansson et al. | 292/170 |
| 6,625,425 | B1 | * | 9/2003 | Hughes et al. | 455/90.3 |
| 7,052,799 | B2 | * | 5/2006 | Zatezalo et al. | 429/97 |
| 7,165,791 | B2 | * | 1/2007 | Rebel et al. | 292/137 |
| 7,188,871 | B2 | * | 3/2007 | Nemoto et al. | 292/170 |
| 7,201,411 | B2 | * | 4/2007 | Bella et al. | 292/336.3 |
| 7,234,735 | B2 | * | 6/2007 | Harada | 292/170 |
| 2006/0038413 | A1 | * | 2/2006 | Rebel et al. | 292/165 |
| 2007/0120376 | A1 | * | 5/2007 | Bella | 292/163 |

FOREIGN PATENT DOCUMENTS

JP    11-159215    *    6/1999

* cited by examiner

*Primary Examiner*—Patricia Engle
*Assistant Examiner*—Mark Williams
(74) *Attorney, Agent, or Firm*—Andrew C. Cheng (57) ABSTRACT

A battery cover latching mechanism (300) for latching a battery cover (20) on a housing (10) of a portable electronic device. The battery cover has a fixing portion (204) defining a hollow (206) therein. The latching mechanism includes a button (30), a locking member (40) and an elastic member (60). The button (30) has an inclined surface (308). The locking member has a claw (408) engaged with the hollow and a slanted surface (414) that resists the inclined surface. The button is mounted in the housing and is movable along a first direction. When the button moves along the first direction, the locking member is driven to slide along a second direction perpendicular to the first direction, so as to move the claw from a first position where the claw engages in the hollow to a second position where the claw releases from the hollow.

6 Claims, 7 Drawing Sheets

BATTERY COVER LATCHING MECHANISM FOR PORTABLE ELECTRONIC DEVICE

BACKGROUND OF THE INVENTION

1. Field of the Invention

The present invention generally relates to battery cover latching mechanisms and, more particularly, to a battery cover latching mechanism for a portable electronic device.

2. Discussion of the Related Art

Batteries are widely used in portable electronic devices, such as personal digital assistants (PDAs), mobile phones and so on. A conventional battery is attachably received in a housing of the electronic device, and a battery cover is designed to connect with the housing so as to enclose and protect the battery. The battery has to be replaced by removing the battery cover when the battery is, for example, damaged, exhausted, and/or in need of recharging or replacement.

A clasping structure or latching structure is used to engage a conventional battery cover with a housing of a portable electronic device. A typical latching mechanism includes a pair of hooks at one end of the battery cover and a locking pin protruding from the other end of the battery cover. Accordingly, a pair of grooves is defined in one end portion of a backside of a housing of the mobile phone, and a locking hole is defined in the other end portion of the backside of the housing. In assembly, the hooks are first inserted into the grooves in the backside of the housing, then, the battery cover is pressed downwardly to the housing until the locking pin on the battery cover is inserted into the locking hole in the backside of the housing. The battery cover is thus assembled to the housing of the mobile phone. The latching mechanism is simple in structure, and the engagement between the battery cover and the housing of the mobile phone is firm. However, during disassembly, great effort is needed to disassemble the battery cover, thereby requiring a relatively substantial force to be exerted thereon. Therefore, the battery cover is susceptible to damage. As a result, it is difficult for a user to replace a battery in the conventional housing of the mobile phone.

Therefore, a new battery cover latching mechanism is desired in order to overcome the above-described shortcomings.

SUMMARY OF THE INVENTION

A battery cover latching mechanism is used to latch a battery cover on a housing of a portable electronic device. The housing defines a receiving hole and a groove therein. The receiving hole of is in communication with the groove. The battery cover includes a fixing portion received in the groove of the housing. The fixing portion of the battery cover has a hollow defined therein. The battery cover latching mechanism includes a button, a locking member and an elastic member. The button has an inclined surface. The locking member has a slanted surface and having a claw corresponding to the hollow of the fixing portion. The button is mounted in the receiving hole of the housing and is movable along a first direction. The locking member is mounted on the housing, the inclined surface of the button engages with the slanted surface of the locking member in manner such that when the button moves along the first direction. The locking member is driven to slide along a second direction perpendicular to the first direction, so as to move the claw from a first position where the claw engages in the hollow to a second position where the claw releases from the hollow. The elastic member provides force to return the locking member to its original position.

Other advantages and novel features of the embodiments will become more apparent from the following detailed description thereof, when taken in conjunction with the accompanying drawings.

BRIEF DESCRIPTION OF THE DRAWINGS

Many aspects of the battery cover latching mechanism can be better understood with reference to the following drawings. The components in the drawings are not necessarily to scale, the emphasis instead being placed upon clearly illustrating the principles of the present battery cover latching mechanism and its potential applications. Moreover, in the drawings, like reference numerals designate corresponding parts throughout the several views.

DETAILED DESCRIPTION OF THE EMBODIMENTS

Figure 1:
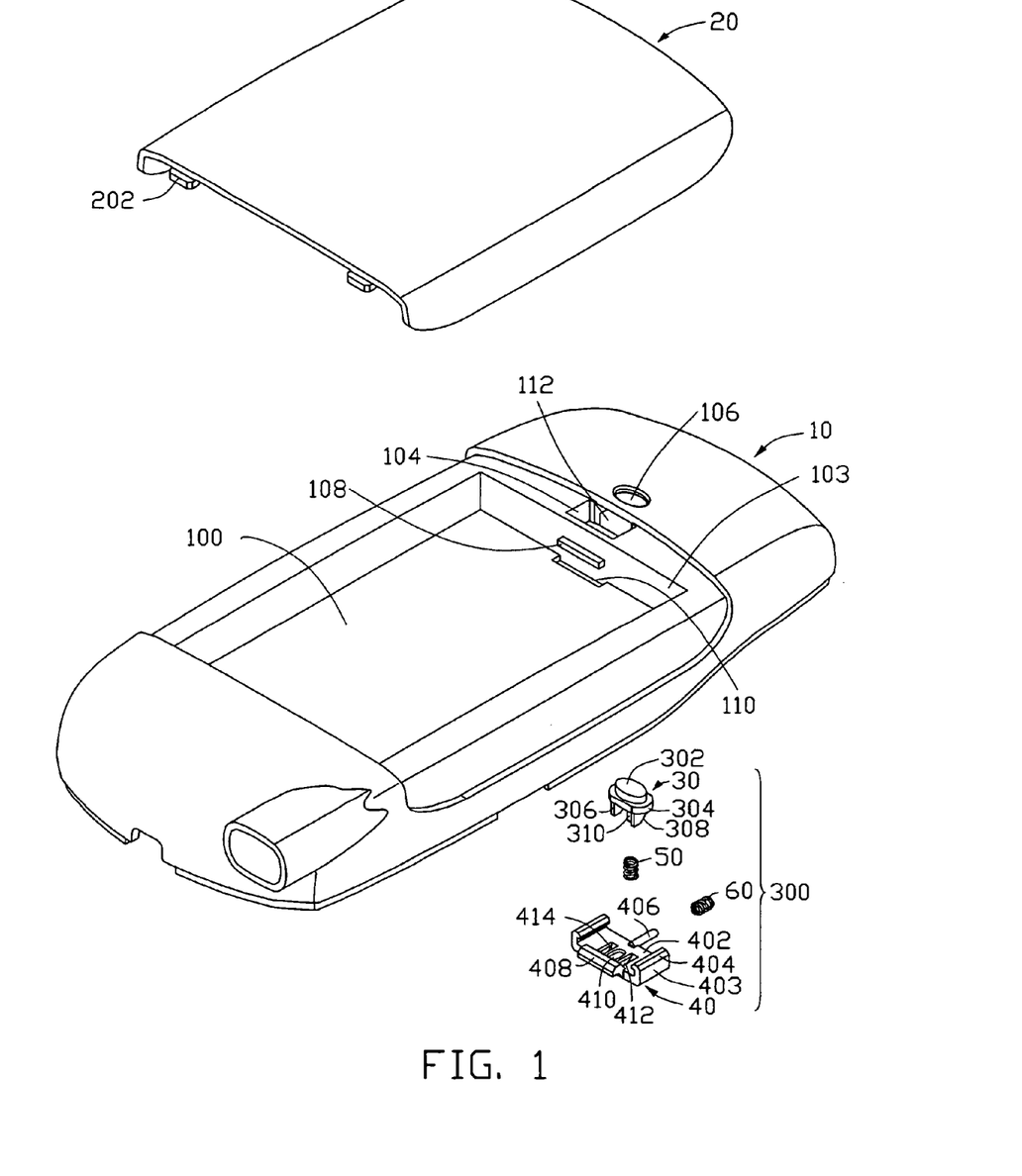
FIG. 1 is an exploded, isometric view of a battery cover latching mechanism for connecting a battery cover and a housing of a portable electronic device, in accordance with a preferred embodiment.

Referring now to the drawings in detail, FIG. 1 shows a battery cover latching mechanism 300 for use in a mobile phone (not labeled). The mobile phone is taken here as an exemplary application, for the purposes of describing details of the battery cover latching mechanism of a preferred embodiment of the present invention. The mobile phone includes a housing 10 and a battery cover 20, connected together via the battery cover latching mechanism 300. The latching mechanism 300 includes a button 30, a locking member 40, a first elastic member 50 and a second elastic member 60. The latching mechanism 300 is mounted in the housing 10 and releasably locks the battery cover 20, thereby interconnecting the housing 10 and the battery cover 20.

Figure 2:
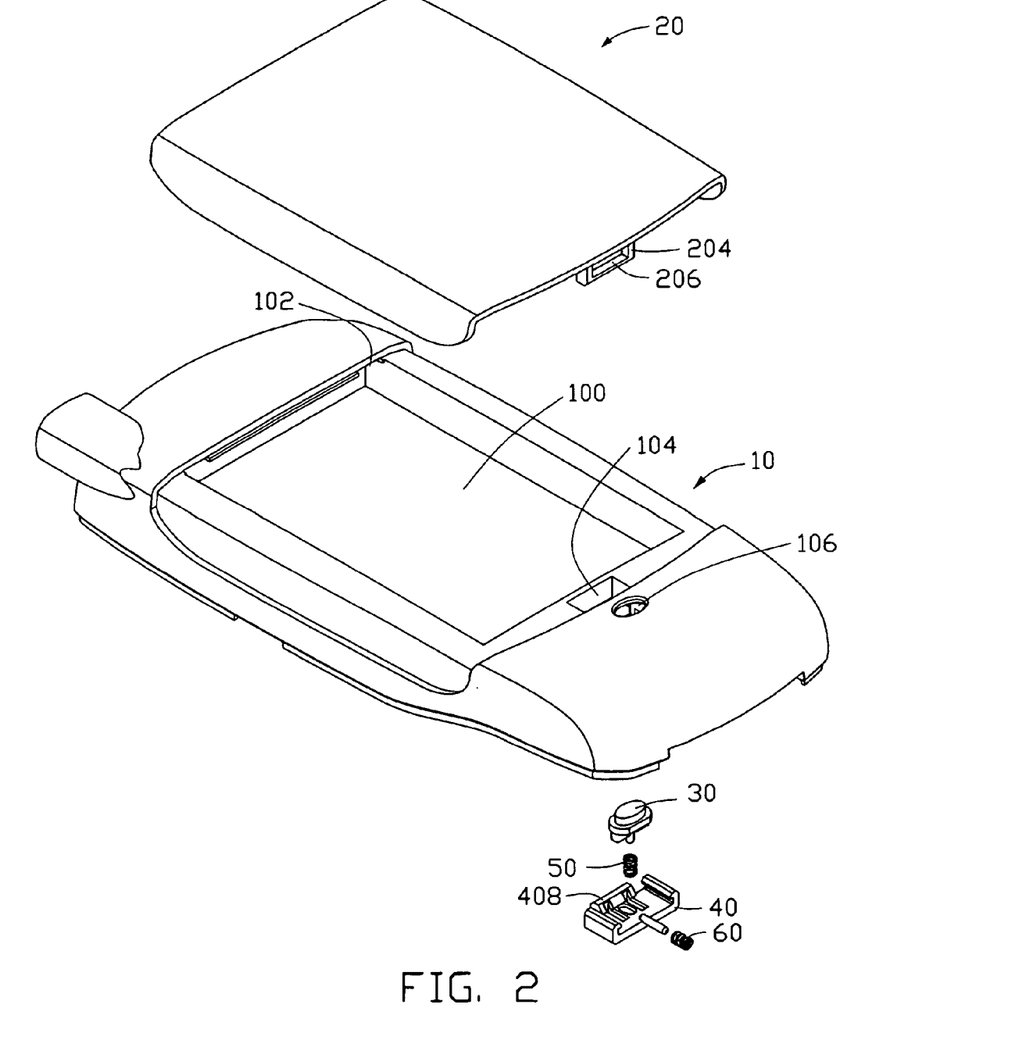
FIG. 2 is similar to FIG. 1 but viewed from another aspect.
Figure 3:
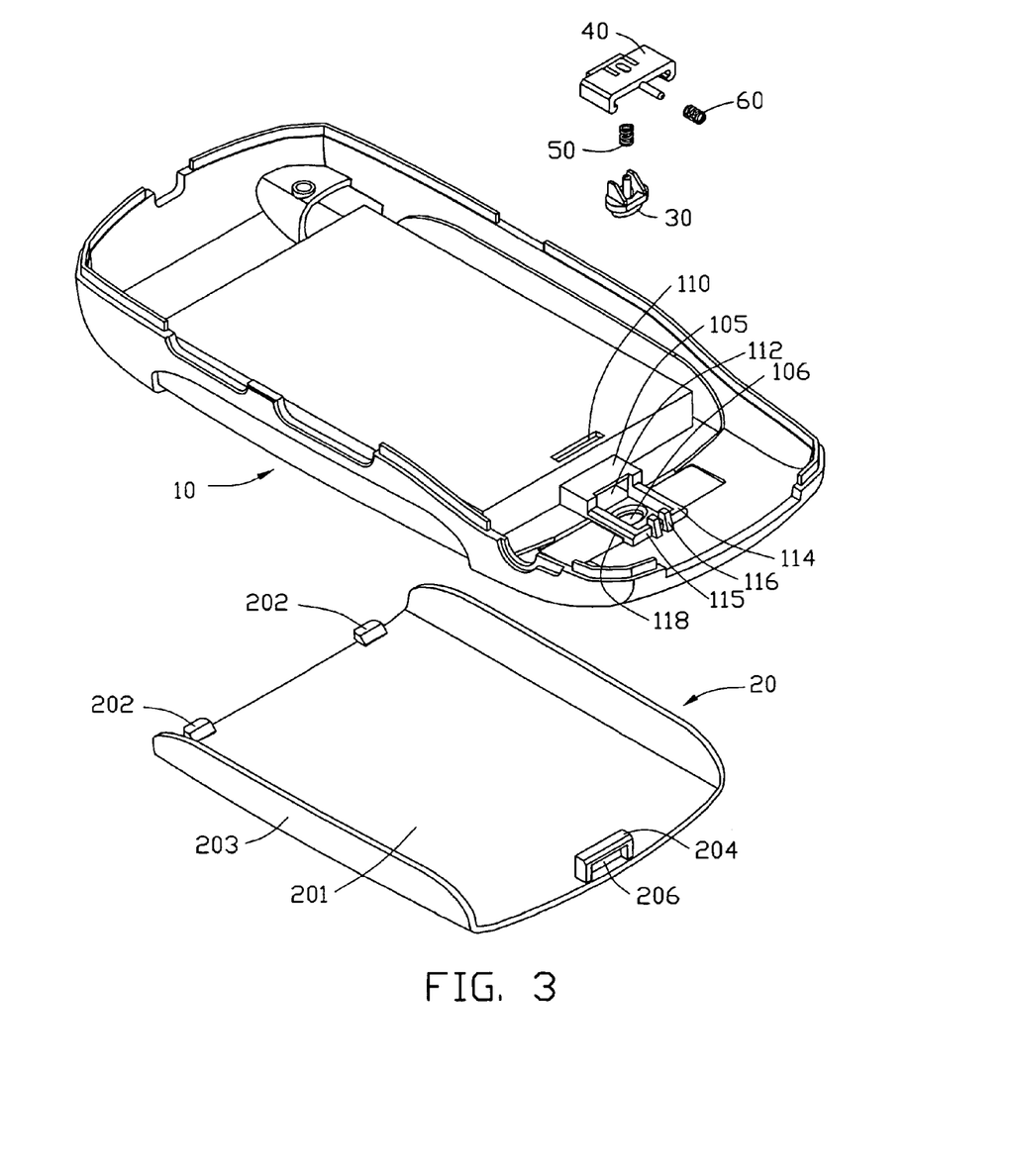
FIG. 3 is similar to FIG. 1, but viewed from a third aspect.

Referring to FIG. 2 and FIG 3, the housing 10 is a rear cover of the mobile phone. A cavity 100 for accommodating a battery (not shown) is defined in a first side of the housing 10, and a sidewall 103 is formed on the housing 10 to form the cavity 100. Two slots 102 are symmetrically defined in the housing 10 and are opposite to the sidewall 103 relative to the cavity 100. A groove 104 adjacent to the sidewall 103 and a receiving hole 106 adjacent to the groove 104 are defined on the first side of the housing 10. The groove 104 is disposed between the cavity 100 and the receiving hole 106. The groove 104 defined in the first side of the housing 10 forms a hollow block 105 on an opposite second side of the housing 10. A cutout 112 is defined in the hollow block 105 to communicate the groove 104 and the receiving hole 106. A protrusion 108 is formed on the sidewall 103 and a through hole 110 is defined in the bottom of the cavity 100 below the protrusion 108. Two symmetrical strips 114 formed on the second side of the housing 10 extend from two sides of the cutout 112. Two hems 115 are perpendicularly connected to the strips 114 respectively. Two strips 114 and the hems 115 function as a guiding portion configured for guiding the movement of the locking member 40. Two resisting blocks 116, which are spaced to each other, are formed between the hems 115. Two guiding slots 118 are respectively defined in the bottom of the strips 114. The protrusion 108 and the through hole 110 are used to fit the battery.

The battery cover 20 is approximately a rectangular board including a bottom wall 201 and two side walls 203. A pair of tabs 202 are formed on one end of the battery cover 20 and a fixing portion 204 is formed on an opposite end of the battery cover 20. Facing the exterior of the battery cover 20, a hollow 206 is defined in the fixing portion 204. The tabs 202 are configured to engage with the slots 100 of the housing 10.

Figure 4:
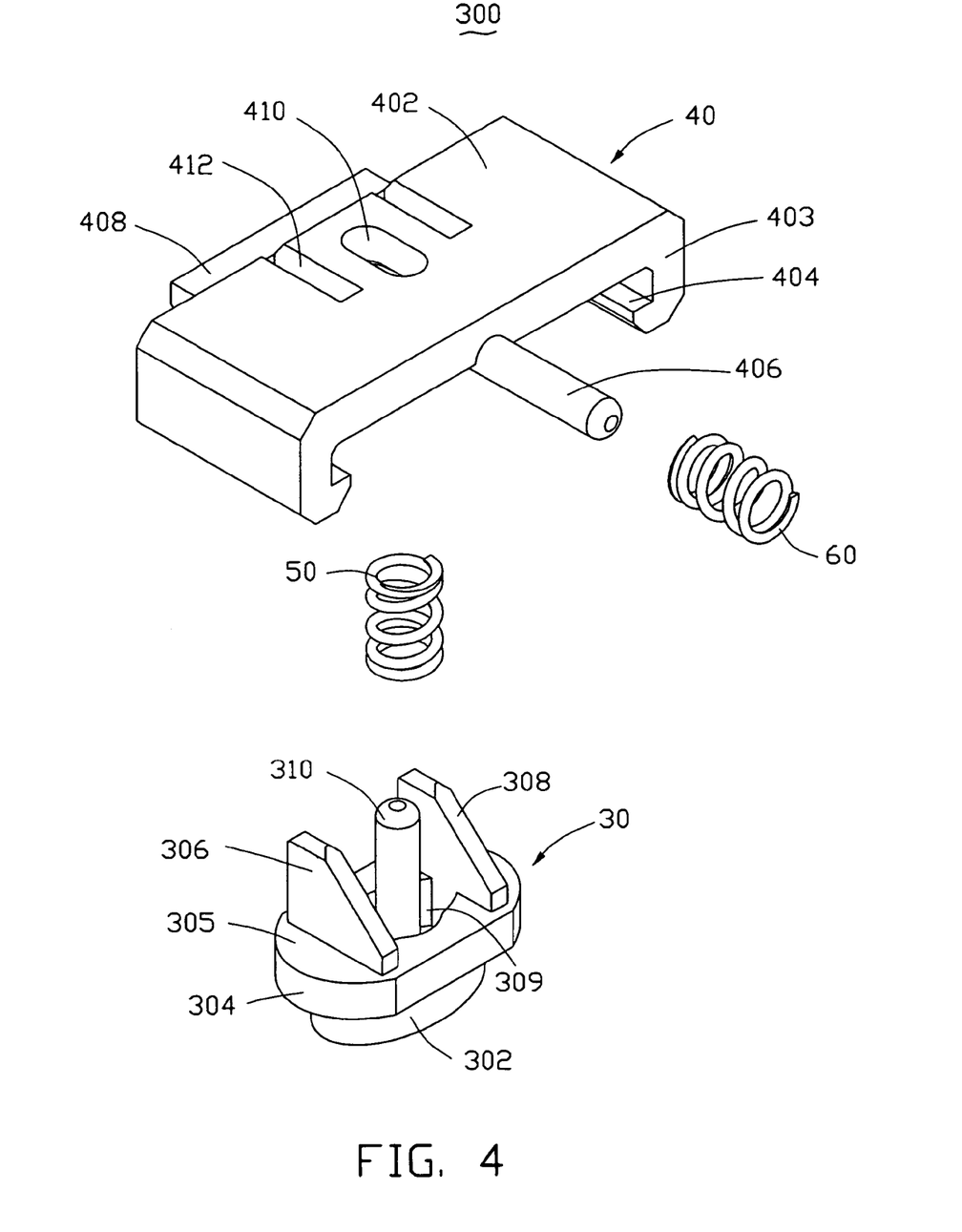
FIG. 4 is an exploded, isometric view of a part of the latching mechanism in FIG. 1.

Also referring to FIG. 4, the button 30 includes a pressing portion 302, a flange portion 304, and two symmetrical extending walls 306. The pressing portion 302 and the flange portion 304 are ellipsoid cylinders. That is, the pressing portion 302 and the flange portion 304 are column-shaped, and have elliptic-shaped. The pressing portion 302 is connected to the flange portion 304, and the extending walls 306 are formed on a mounting surface 305 of the flange portion 304 opposite to the pressing portion 302. A notch 309 is defined in the flange portion 304, and a first pole 310 is formed between the extending walls 306 at the bottom of the notch 309. Each extending wall 306 has an inclined surface 308 at a slant to the axis of the first pole 310. The button 30 is mounted in the receiving hole 106 of the housing 10. The receiving hole 106 is larger than the pressing portion 302, but smaller than the flange portion 304. The first elastic member 50 surrounds the first pole 310.

The locking member 40 includes a base board 402. Two bending boards 403 are perpendicularly formed at two opposite ends of the base board 402. Shorter than the guiding slots 118 of the housing 10, two guiding hooks 404 are perpendicularly formed at the ends of the bending boards 403. The guiding hooks 404 engage with the guiding slots 118 to slidably mount the locking member 40 on the housing 10. A second pole 406 and a claw 408 are formed at opposite ends of the base board 402. An axis of the second pole 406 is parallel to the base board 402. The second elastic member 60 surrounds the second pole 406. The claw 408 is located in the hollow 206 of the battery cover 20. Parallel to the axis of the second pole 406, a protruding hole 410 and two inserting slots 412 are defined in the base board 402. The inserting slots 412 are symmetrically defined either side of the protruding hole 410. Surfaces facing the claw 408 and defining the inserting slots 412 each has a slanted surface 414. The slanted surface 414 engages with the inclined surface 308 of the button 30.

The first and second elastic members 50, 60 are helical, column-shaped springs.

Figure 5:
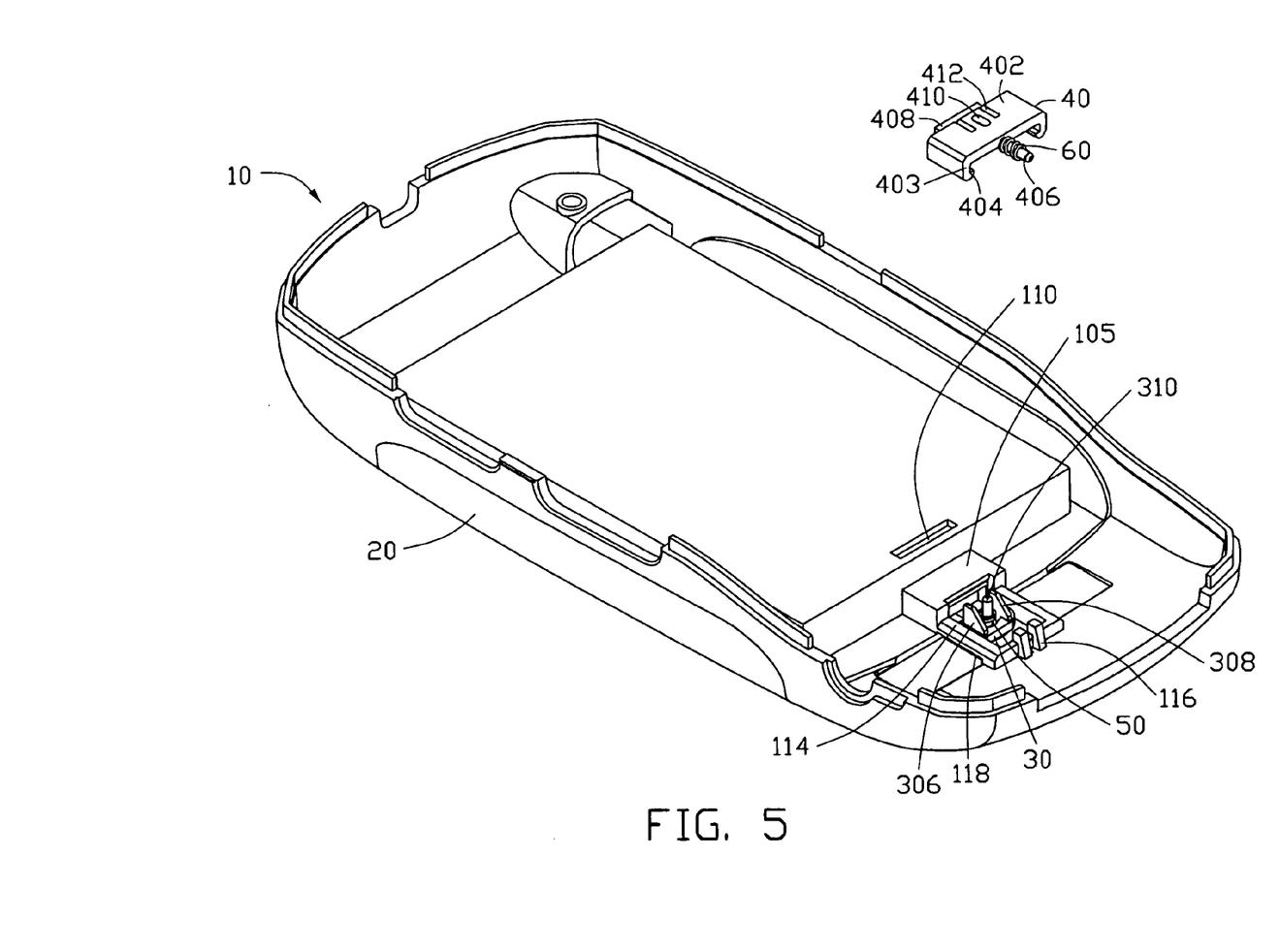
FIG. 5 is an partially assembled, isometric view of the latching mechanism in FIG. 4.
Figure 6:
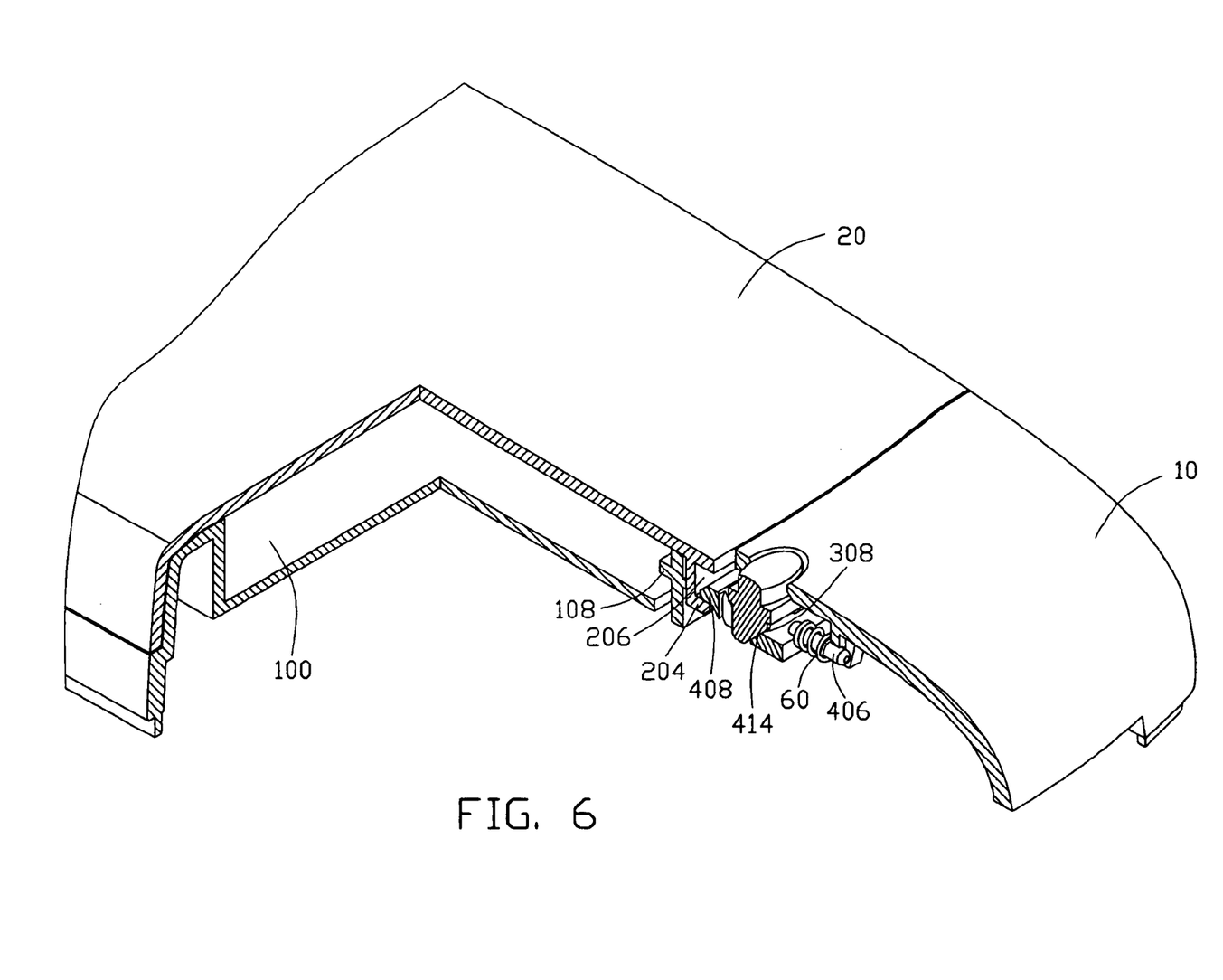
FIG. 6 is an partial cross-sectional view of the assembled latching mechanism in FIG. 1.
Figure 7:
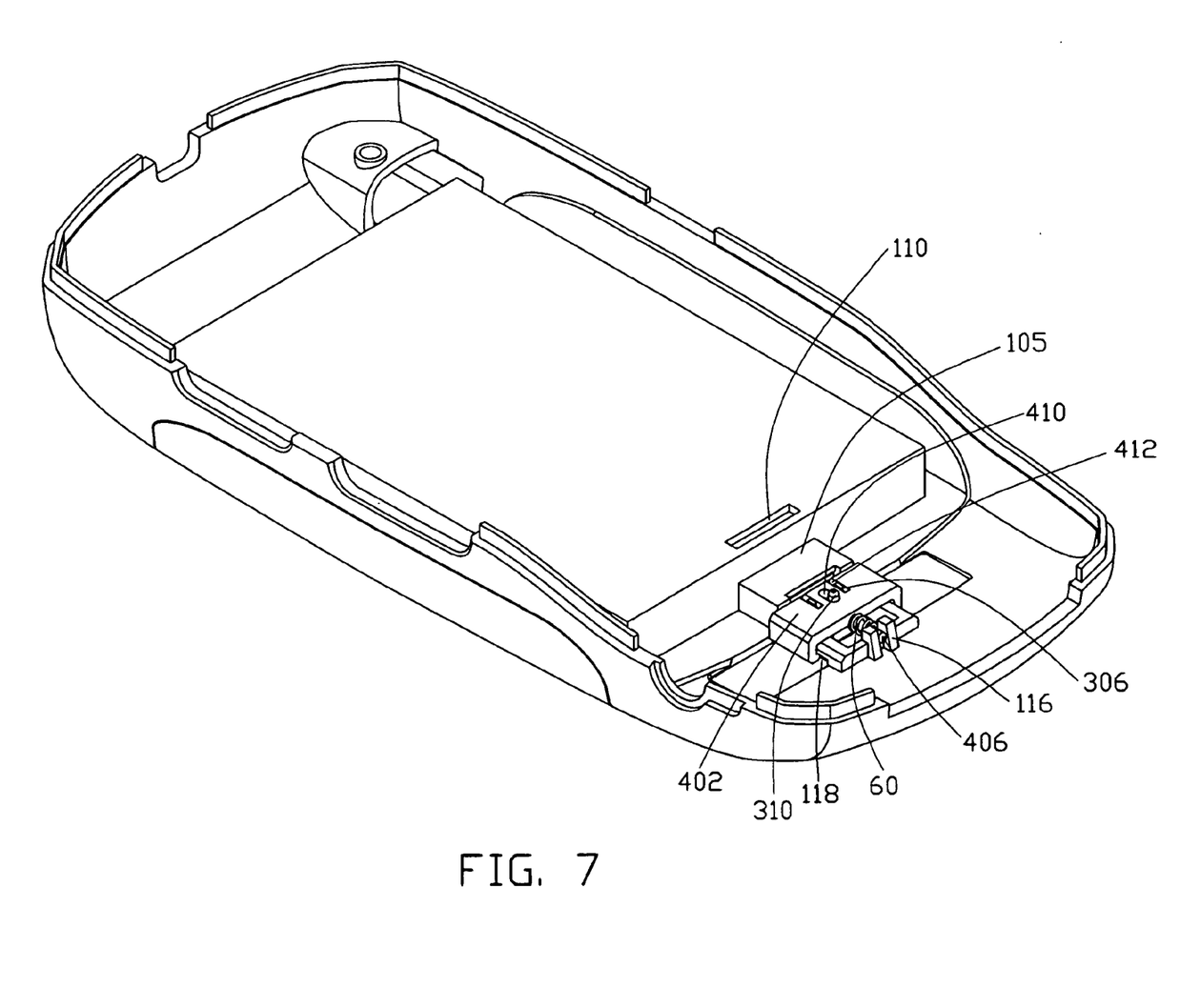
FIG. 7 is an assembled, isometric view of a part of the latching mechanism in FIG. 1.

In assembly, referring to FIG. 5, the button 30 is located in the receiving hole 106 of the housing 10 from the second side of the housing 10, and the pressing portion 302 is exposed to the first side of the housing 10. The button 30 is movable along the axis of the receiving hole 106 of the housing 10. The flange portion 304 prevents the button 30 from falling off the housing 10. The first and second elastic members 50 are mounted surrounding the first and second poles 310, 406. Referring to FIG 6 and FIG. 7, the locking member 40 is located on the housing 10. The guiding hooks 404 of the locking member 40 are slidably inserted into the guiding slots 118 of the housing 10. The second pole 406 is set between the two resisting blocks 116, one end of the second elastic member 60 resists the locking member 40, and the other end resists the resisting blocks 116. The first pole 310 arid the extending walls 306 respectively protrude out from the protruding hole 410 and the inserting slots 412. The slanted surface 414 engages with the inclined surface 308 of the button 30. Thereby, the locking member 40 will be pushed to slide when the button 30 is pressed. The claw 408 of the locking member 40 is thus inserted into the groove 104 via the cutout 112 of the housing 10.

When the battery cover 20 is assembled to the housing 10, the battery cover 20 is located on the housing 10. The tabs 202 engage with the slots 102. Pressing the button 30, the first elastic member 50 is compressed, and the button 30 urges the locking member 40 to slide relative to the housing 10 along, the guiding slots 118 due to its engagement with the inclined surface 308 of the button 30 and the slanted surface 414 of the locking member 40. Thus, the claw 408 retreats from the groove 104 of the housing 10, and the second elastic member 60 is compressed. At this moment, pressing the battery cover 20, the battery cover 20 engages with the housing 10, and the fixing portion 204 of the battery cover 20 protrudes into the groove 104 of the housing 10. Releasing the button 30, the button 30 and the locking member 40 are reset to an original position for the elasticity of the first and second elastic members 50, 60 respectively. The claw 408 of the locking member 40 inserts into the groove 104 of the housing 10 again and protrudes in the hollow 206 of the fixing portion 204 of the battery cover 20. Thus, the battery cover 20 is firmly mounted on the housing 10.

When the battery cover 20 is detached from the housing 10 by pressing the button 30. This compresses the first elastic member 50, and the button 30 urges the locking member 40 to slide relative to the housing 10 along the guiding slots 118. The claw 408 retreats from the hollow of the fixing portion 204 of the battery cover 20, and the second elastic member 60 is thus compressed. Thereby, the battery cover 20 is released and can be removed from the housing 10. Then releasing the button 30, the button 30 and the locking member 40 are reset to an original position due to the elasticity of the first and second elastic members 50, 60 respectively.

As described above, the preferred embodiment provides a battery cover latching mechanism for portable electronic devices, such as mobile phones. The battery cover is removed easily by simply pressing the button. This button-activated latching mechanism gives the user a both quick and user-friendly method for latching/unlatching a structure. It is further to be understood that such a button-activated latching mechanism could prove useful in allowing releasable attachment of covers or doors of other devices, and such uses are considered to be within the scope of the present latching mechanism.

In an alternative embodiment, the first and second elastic members 50, 60 can be other kinds of matters such as rubber tubes. The first pole 310 and the first elastic member 50 can be replaced by an elastic pole, and correspondingly, the second pole 406 and the second elastic member 60 can be replaced by an elastic pole. The first elastic member 50 can be omitted, and the button 30 and the locking member 40 can be returned to their original position by the second elastic member 60. The guiding slots 118 of the housing 10 can be replaced by other kind of locking portions such as projections formed on the strips 114. Accordingly, the guiding hook 404 of the locking member 40 can be replaced by other kind of locking portions such as slots or holes.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover latching mechanism for use in a portable electronic device, the portable electronic device having a housing and a battery cover, the housing defining a receiving hole and a groove, the battery cover comprising a fixing portion received in the groove of the housing, the receiving hole of the housing being in communication with the groove, the fixing portion of the battery cover having a hollow defined therein, the battery cover latching mechanism comprising:
   a button having an inclined surface, the button being received in the receiving hole of the housing;
   the housing defining a cavity for receiving a battery at a first side thereof and two slots at one end of the cavity, the groove being defined adjacent to an opposite end of the cavity, the groove being formed between the cavity and the receiving hole, the groove forming a hollow block on an opposite second side of the housing, the hollow block defining a cutout therein to communicate the groove and the receiving hole, two symmetrical strips respectively extending from two sides of the cutout are formed on the second side of the housing, two resisting blocks, which are spaced to each other, being formed opposite to the cutout, two guiding slots being defined in the strips;
   a locking member slidably mounted in the housing, the locking member comprising a base board, the base board having two guiding hooks formed at two respective ends thereof, each guiding hook being configured for slidably engaging with the housing, the base board having a slanted surface and having a claw corresponding to the hollow of the fixing portion; and
   an elastic member being configured for providing an elastic force for returning the locking member to an original position thereof;
   wherein the inclined surface of the button engages with the slanted surface of the locking member.

2. The battery cover latching mechanism as claimed in claim 1, wherein the housing has two guiding slots respectively engaging with a corresponding guiding hook of the locking member.

3. The battery cover latching mechanism as claimed in claim 1, wherein the button comprises a pressing portion, a flange portion, and two extending walls with said inclined surface, the receiving hole of the housing is larger than the pressing portion and smaller than the flange portion.

4. The battery cover latching mechanism as claimed in claim 3, wherein the button has a first pole mounted between the two extending walls, the latching mechanism further comprises another elastic member resisting the blocks and surrounding the first pole for returning the button to an original position.

5. The battery cover latching mechanism as claimed in claim 1, wherein the claw and a second pole are formed at two other ends of the base board, the elastic member surrounds the second pole.

6. The battery cover latching mechanism as claimed in claim 4, wherein the base board defines a protruding hole and two inserting slots parallel to the axis of the pole, the first pole and the extending walls are respectively inserted into the protruding hole and the inserting slots, and protrude out from the protruding hole and the inserting slots.

* * * * *

UNITED STATES PATENT AND TRADEMARK OFFICE
CERTIFICATE OF CORRECTION

PATENT NO. : 7,441,813 B2  Page 1 of 1
APPLICATION NO. : 11/398059
DATED : October 28, 2008
INVENTOR(S) : Zhong-Shu Qin et al.

It is certified that error appears in the above-identified patent and that said Letters Patent is hereby corrected as shown below:

In Title Page:

Item (73) Assignees: "Sutech Trading Limited, Tortola (VG); Shenzhen Futaihong Precision Industry Co., Ltd., Shenzhen, Guangdong Province (CN)" should read --Shenzhen Futaihong Precision Industry Co., Ltd., Shenzhen, Guangdong Province (CN); Sutech Trading Limited, Tortola (VG)--

Signed and Sealed this

Third Day of February, 2009

JOHN DOLL
*Acting Director of the United States Patent and Trademark Office*